United States Patent

Bianchetta et al.

[11] 3,720,282
[45] March 13, 1973

[54] HYDRAULIC STEERING SYSTEM

[75] Inventors: Donald L. Bianchetta, Coal City; Richard L. M. Sears, Washington; Orcenith D. McWilliams, Morris; James E. Scheidt, Joliet, all of Ill.

[73] Assignee: Caterpillar Tractor Co., Peoria, Ill.

[22] Filed: Sept. 15, 1971

[21] Appl. No.: 180,750

[52] U.S. Cl. ...................... 180/79.2 R, 60/52 S
[51] Int. Cl. ...................................... B62d 5/08
[58] Field of Search ............... 180/79.2 R; 60/52 S

[56] References Cited

UNITED STATES PATENTS

| | | | |
|---|---|---|---|
| 2,768,699 | 10/1956 | Gardiner et al. | 180/79.2 R |
| 3,249,175 | 5/1966 | Gordon | 180/79.2 R |
| 3,436,915 | 4/1969 | Mercier | 60/52 S |
| 3,463,260 | 8/1969 | Baines et al. | 180/79.2 R |
| 3,473,324 | 10/1969 | Mercier | 60/52 S |

*Primary Examiner*—Leo Friaglia
*Assistant Examiner*—Leslie J. Paperner
*Attorney*—Fryer, Tjensvold, Feix, Phillips & Lempio

[57] ABSTRACT

An all-hydraulic steering system for wheeled vehicles incorporating a differential valve that maintains a predetermined, constant-pressure differential in the system so that the effort required by the operator to steer is a constant value. The system also includes a hydraulic follow-up mechanism having means in association with the differential valve for automatically bleeding the follow-up circuit during operation of the vehicle.

16 Claims, 2 Drawing Figures

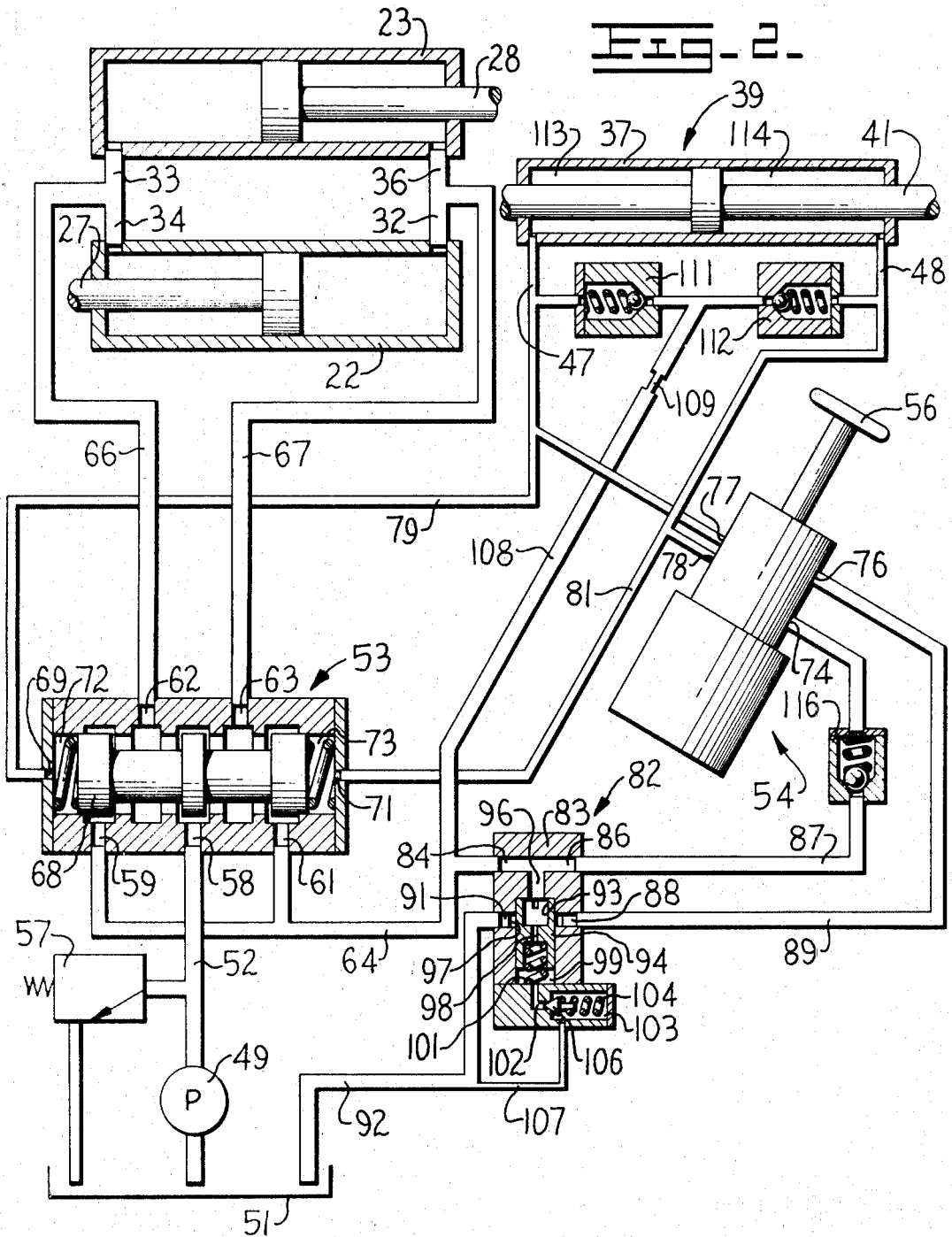

HYDRAULIC STEERING SYSTEM

BACKGROUND OF THE INVENTION

Various hydraulic steering systems include a steering valve hydraulically controlled by a steering-wheel-operated, fluid-metering unit to deliver pressurized fluid to steering actuating cylinders associated with the wheels of a vehicle to turn same in accordance with the direction, number, and speed of revolutions that the operator turns the steering wheel. More particularly, the steering valve is typically arranged to control the direction and rate of pressurized fluid flow to and from the opposite ends of the steering cylinders in accordance with the direction and rate of displacement of a hydraulically-actuated valve spool. The fluid metering unit delivers the spool displacement fluid to the steering valve with a direction and rate determined by the direction, number, and speed of steering wheel revolutions. In this manner, steering valve spool displacement is controlled in accordance with steering wheel rotation to, in turn, correspondingly effect actuation of the steering cylinders. Generally, the fluid pressure differential between inlet and outlet ports of the metering unit tends to fluctuate such that varied degrees of steering wheel turning effort on the part of the operator are required to meter a given rate of spool displacement fluid, and thus effect a given amount of steering.

When a steering system of the foregoing type is made all-hydraulic, the usual mechanical follow-up linkage is replaced by a hydraulic follow-up mechanism. Such a mechanism is susceptible to the entry of air into the follow-up circuit which renders the follow-up function spongy and thereby detracts from the precise steering control of the vehicle.

SUMMARY OF THE INVENTION

The present invention relates to an all-hydraulic steering system for wheeled vehicles, and is more particularly directed to such a system which is arranged such that the effort required by an operator to steer the vehicle is a constant value, and which further features a full, solid, properly-functioning, hydraulic follow-up system to enhance precise steering control of the vehicle.

It is an object of the present invention to provide a hydraulic steering system of the type including a steering-cylinder-actuating, hydraulic steering valve controlled by a steering-wheel-operated, fluid-metering unit which incorporates differential valve means to maintain a constant, predetermined pressure differential between the supply and return ports of the metering unit commensurate with a constant steering effort on the part of an operator.

Another object of the invention is the provision of a hydraulic steering system of the class described having a hydraulic follow-up mechanism including means for automatically bleeding the follow-up circuit during vehicle operation to purge any air therefrom and thus provide a full, solid, hydraulic follow-up function.

It is a further object of the invention to provide a hydraulic steering system of the class described including means for preventing any violent action of the steering cylinders or follow-up mechanism from detrimentally spinning the steering wheel.

BRIEF DESCRIPTION OF THE DRAWINGS

FIG. 2 is a schematic, hydraulic-circuit diagram of the steering system.

DETAILED DESCRIPTION OF THE INVENTION

Figure 1:
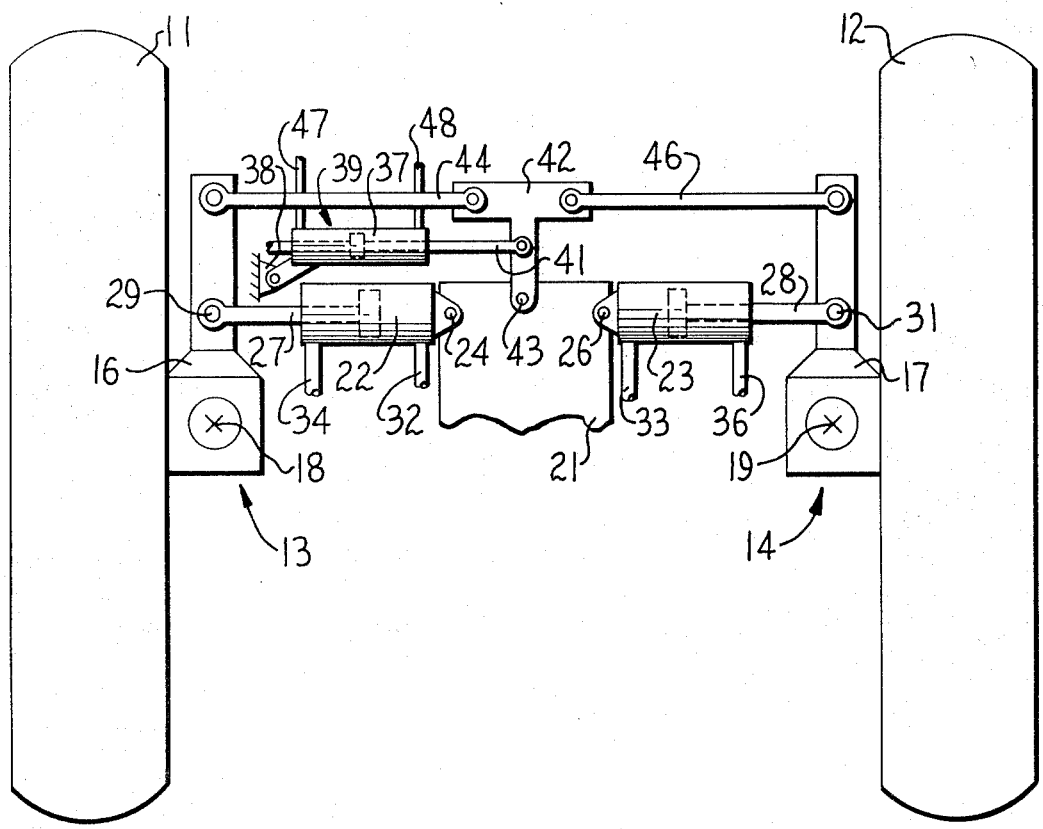
FIG. 1 is a semi-schematic plan view of actuating components of an all-hydraulic steering system in accordance with the present invention as incorporated in a wheeled vehicle.

Referring now to FIG. 1 in detail, there is shown a pair of wheels 11 and 12 of a wheeled vehicle carried by suspension assemblies 13 and 14 including spindles 16 and 17 pivotal about vertical axes 18 and 19 with respect to the vehicle frame 21. A pair of hydraulic steering cylinders 22 and 23 are respectively coupled between the frame and spindles 16 and 17 to effect pivoting thereof about axes 18 and 19, and thus turning of the wheels 11 and 12.

More particularly, the head ends of the cylinders are pivotally connected to the frame, as indicated at 24 and 26. The piston rods 27 and 28 of the cylinders 22 and 23 are pivotally connected to spindles 16 and 17 as indicated at 29 and 31. Fluid conduits 32 and 33 are communicably connected to the head ends of cylinders 22 and 33, while conduits 34 and 36 are communicably connected to the rod ends thereof.

By controlling the directions of pressurized fluid flow through the conduits to and from the opposite ends of the cylinders, the rods 27 and 28 are appropriately extended or retracted to effect opposite turning movements of the wheels 11 and 12. In this regard, when pressurized fluid is delivered through conduits 33 and 34 and fluid is returned through conduits 32 and 36, rod 27 of cylinder 22 is retracted, while rod 28 of cylinder 23 is extended. Such translations of the rods effect clockwise pivoting of spindles 16 and 17 to thereby produce a right turning movement of the wheels 11 and 12. Conversely, when the direction of fluid flow is reversed such that pressurized fluid is delivered through conduits 32 and 36 and fluid is returned through conduits 33 and 34, rod 27 is extended while rod 28 is retracted. Counterclockwise pivoting of spindles 16 and 17 is thereby effected commensurate with a left turning movement of the wheels.

A hydraulic follow-up cylinder 37 is coupled to the spindles 16 and 17 to provide a follow-up function upon turning of the wheels 11 and 12 in either direction. More particularly, the cylinder is pivotally connected to the machine frame, as indicated at 38, and includes a double-ended piston and rod assembly 39 having one end rod 41 pivotally connected to a T-bar 42 pivotally connected at 43 to the frame 21.

Spindles 16 and 17 are coupled to opposite ends of the T-bar by means of a pair of pivotally, end-connected rods 44 and 46 to impart spindle pivotal movement to the T-bar. As a result, clockwise pivotal movement of the spindles effects clockwise pivotal movement of the T-bar which produces translation of the piston and rod assembly 39 towards the right, as viewed in FIG. 1.

Such action permits fluid in a conduit 47 communicated with the opposite or left end of the cylinder to flow thereinto and expels fluid from the right end of cylinder 37 through a conduit 48 communicated therewith to thereby provide a clockwise, pivotal-movement, followtup function to be more fully described hereinafter. Conversely, counterclockwise pivotal movement of the spindles results in counterclockwise pivotal movement of the T-bar which produces translation of assembly 39 towards the left. Fluid in conduit 48 is thus permitted to flow into the right end of cylinder 37 while fluid is expelled from the left end through conduit 47, thereby providing counterclockwise, pivotal-movement, follow-up function to be more fully described hereinafter.

Pressurized fluid flow to and from the opposite ends of the steering cylinders 22 and 23 and follow-up cylinder 37 to effect the previously-noted turning movements of the vehicle wheels 11 and 12 is controlled by means of a hydraulic control circuit, as depicted in FIG. 2. In this regard, an engine-driven pump 49, communicated with a fluid reservoir 51, supplies the necessary pressurized fluid for operation of the steering system via conduit 52 through a steering valve 53 arranged to control the direction and rate of pressurized fluid flow to and from the opposite ends of the steering cylinders 22 and 23 in accordance with fluid signals emanating from a fluid metering unit 54 operated by the vehicle steering wheel 56. The pump 49 is bridged by a relief valve 57 which limits the maximum pressure of the fluid delivered to the system.

The steering valve 53 includes an inlet port 58, a pair of return ports 59 and 61, and a pair of control ports 62 and 63. Conduit 52 is connected to inlet port 58 and return ports 59 and 61 are commonly connected to a return conduit 64. Control port 62 is connected via conduit 66 in common with steering cylinder conduits 33 and 34, while control port 63 is connected via conduit 67 in common with steering cylinder conduits 32 and 36.

Valve 53 includes a spool 68 which is selectively translatable from a central neutral position, as shown in FIG. 2, to first and second actuated positions displaced in opposite directions from the neutral position to control fluid flow between the inlet port, control ports, and return ports of the valve.

It is to be noted that in the drawing the lands of the spool are drawn in a purely diagramatic fashion to indicate the open-center design of the valve, whereas actually the valve internally contains flow-control and pressure-compensation characteristics which are not shown in the drawing nor described in the present description. For details of the valve, reference may be had to copending Application Ser. No. 302,897, now U.S. Pat. No. 3,260,325, assigned to the same assignee as the present invention. For purposes of the present description, it suffices to state that in the neutral position of the spool, inlet port 58 is communicated with return ports 59 and 61 such that fluid flow is from supply conduit 52 to return conduit 64.

In the first actuated position of the spool displaced to the right of neutral position, inlet port 58 is communicated with control port 62 and control port 63 is communicated with return port 61. The fluid flow is thus from supply conduit 52 to steering cylinder conduits 33 and 34 via conduit 66 and from steering cylinder conduits 32 and 36 to return conduit 64 via conduit 67. This results in the right turning movement of the wheels 11 and 12 in the manner previously described.

In the second actuated position of the spool displaced to the left of neutral position, inlet port 58 is communicated with control port 63, and control port 62 is communicated with return port 59. The direction of fluid flow with respect to the steering cylinder conduits is thereby reversed, resulting in the left turning movement of the wheels 11 and 12.

The rate of turning of the wheels is determined by the rate of fluid flow to and from the steering cylinders, which, in turn, is controlled by the amount of displacement of the spool from neutral position to either actuated position.

Displacement of the spool of steering valve 53 is arranged to be hydraulically actuated, and in this regard the valve is provided with pilot ports 69 and 71 in communication with chambers 72 and 73 operating on the opposite ends of the spool. When fluid is delivered to port 69, the force developed in chamber 72 by such fluid displaces the spool to the right to its first actuated position at a rate determined by the rate of fluid delivery to the chamber. Conversely, when fluid is delivered to port 71, the spool is displaced to the left to its second actuated position at a rate determined by the rate of fluid delivery to chamber 73.

The rate of fluid delivery to either of the steering valve ports 69 or 71 is determined by the fluid metering unit 54.

More particularly, such unit is provided with supply and return ports 74 and 76 and control ports 77 and 78. In an unactuated position of steering wheel 56, fluid flow is established between supply and return ports 74 and 76. When the steering wheel is turned to the right, communication is blocked between the supply and return ports and is established between the supply port and control port 77, and between control port 78 and return port 76. Conversely, when the steering wheel is turned to the left, communication is blocked between the supply and return ports and is established between the supply port and control port 78 and between the control port 77 and the return port. The rate of fluid flow from either control port is determined by the speed of revolutions of the steering wheel in either direction.

The supply and return ports 74 and 76 of fluid metering unit 54 are respectively coupled to the return conduit 64 of steering valve 53 and to the reservoir 51. Control ports 77 and 78 are respectively coupled via conduits 79 and 81 to ports 69 and 71 of steering valve 53. It will be thus appreciated that pressurized fluid is supplied from return conduit 64 of valve 53 to the ports 69 and 71 and returned therefrom to the reservoir 51 in accordance with turning of the steering wheel 56 in either direction to thereby effect corresponding turning of the wheels 11 and 12 in either direction by means of the steering valve 53 and steering cylinders 22 and 23 in the manner previously described.

It should be noted that variations in the pressure differential between the supply and return ports 74 and 76 of fluid metering unit 54 due to fluctuations in back pressure of the fluid supply system, or the like, cause undesirable variations in the effort required in turning the steering wheel 56 to effect a given turning movement. In accordance with a particularly salient aspect of the present invention, this difficulty is obviated by means of a differential valve 82 which couples return conduit 64 to supply port 74 of metering unit 54 and return conduit 76 thereof to reservoir 51 and is arranged to maintain a predetermined, constant differential pressure across such ports despite fluctuations in system pressure.

The differential valve includes a body 83 having an inlet port 84 communicably connected to steering valve return conduit 64 and an outlet port 86 coupled via a conduit 87 to the supply port 74 of metering unit 54. Valve body 83 is also provided with an inlet port 88 coupled via a conduit 89 to return port 76 of the metering unit and an outlet port 91 coupled via a conduit 92 to reservoir 51.

Ports 84 and 86 are communicated with each other and with an internal bore 93 of a spool 94 by means of a passage 96. The spool is translatable within the body between a normal position (shown in FIG. 2) blocking communication between passage 96 and port 91, and an actuated position wherein communication is established therebetween. Communication between ports 88 and 91 is at all times established by means of an annulus 97 provided within the body circumferentially about the spool.

Thus, the supply fluid in conduit 64 is communicated with metering unit supply port 74 and with internal bore 93 of spool 94, while the return fluid from metering unit return port 76 is communicated with the reservoir 51. The fluid pressure in bore 93 is also communicated through an orifice 98 to a chamber 99 on the opposite side of the spool, which chamber contains a spring 101 biasing the spool to its normal position.

The chamber 99 is communicated via a passage 102 with a chamber 103 containing a spring 104 biasing a poppet 106 into closing relation with the termination of passage 102 in such chamber 103. The latter chamber is communicated through a passage 107 with return conduit 92 such that any back pressure present therein also appears in the chamber and acts on the back face of poppet 106 together with the bias force of spring 104. The pressure in chamber 99, which is the supply pressure present in conduit 64, acts on the front face of the poppet.

With differential valve 82 provided in the manner described above, pressure is created in conduits 64 and 87, passage 96, bore 93, chamber 99, and passage 102 since return of pump flow to the reservoir via metering unit 54 is restricted. When this supply pressure is sufficient to overcome the combined force of back pressure in chamber 103 and spring 104, poppet 106 opens and vents chamber 99. The pressure differential created by flow across orifice 98 then overcomes the force of spring 101 to thereby urge the spool 94 to its actuated position, bypassing to conduit 92 the pump volume in conduit 64 in excess of that required to maintain the pressure required to open poppet 106.

Thus, the desired pressure differential across ports 74 and 76 of metering unit 54 is established by the force of poppet spring 104, and is maintained since the force from pressure in passage 102 is balanced by the additive force from the back pressure present in chamber 103 from conduit 92 and force of the poppet spring.

For example, if the force of spring 104 is set to require 110 psi to open poppet 106, then a back pressure of 25 psi in conduit 92 would result in a pressure of 135 psi in conduit 87 or a differential of 110 psi across the ports of the metering unit. Similarly, a back pressure of 150 psi in conduit 92 results in a pressure of 260 psi in conduit 87 before the valve bypasses excess pump volume, again a 110 psi differential across the ports of the metering unit. Hence, the differential valve 82 serves to maintain a predetermined, constant differential pressure across the ports of the metering unit, commensurate with a constant steering effort being required to effect a given turning movement.

Considering now in more detail the supply of pressurized fluid to the follow-up cylinder 37, it is to be noted that the conduits 79 and 81 from control ports 77 and 78 of fluid metering unit 54 are communicated with the conduits 47 and 48 to the opposite ends of the cylinder. The return conduit 64 of steering valve 53 is connected to a conduit 108 containing an orifice 109 which communicates fluid through two opposed check valves 111 and 112 with the follow-up cylinder conduits 47 and 48. Orifice 109 serves to control the introduction of fluid into either chamber 113 or 114 at the opposite ends of follow-up cylinder 37 from conduit 108.

The check valves 111 and 112 are arranged to offer a small resistance to fluid flow through them, lower than the setting of differential valve 82, minus the pressure drop across metering unit 54. This assures that chambers 113 and 114 of the follow-up cylinder are flushed with fluid whenever a steering correction is made which will keep air purged from the follow-up circuit and components.

When making a steering maneuver to the right, the piston and rod assembly 39 of follow-up cylinder 37 is displaced in the manner previously described to permit fluid to flow into chamber 113 through conduit 47, which fluid is supplied partially through the metering unit due to rotation of the steering wheel 56, and partially from chamber 72 through conduit 79 and 47. Fluid drawing from chamber 72 in turn permits spool 68 to return to neutral to cut off fluid flow to the steering cylinders at the desired steering position. At the same time, excess fluid in chamber 114 is expelled through conduit 81 of the metering unit 54 from which it is returned to reservoir 51 via conduits 89 and 92. The pressure in conduit 108, created by differential valve 82, is at this time communicated through check valve 112 to flush fluid through conduit 81 and purge any air therefrom.

As translation of the assembly 39 is reversed by steering in the opposite direction, chamber 114 is filled with fluid supplied through the metering unit due to rotation of the steering wheel and at this time the pressure in conduit 108 is communicated through check valve 111 to conduit 79 to flush that conduit and purge any air therefrom. In this manner, the follow-up circuit is automatically bled during operation of the vehicle to maintain the circuit full and free of air, thereby providing a solid and properly functioning follow-up system.

It is to be noted that since fluid flow is blocked between supply and return ports 74 and 76 of metering unit 54 when the operator turns the steering wheel 56, the return oil in conduit 64 must flow through differential valve 82 before returning to reservoir 51 through conduit 92. As a result of this action, fluid in conduit 87 and at port 74 is always at a higher pressure than that at return port 91 of valve 82 and at port 76. A check valve 116 is placed in the conduit 87 to block any back flow of fluid therein when a steering maneuver is being made so that any violent action of the steering cylinders 22 and 23 or follow-up cylinder 37, by the wheels 11 and 12 hitting an obstruction, etc., will be prevented from spinning the steering wheel 56 which could endanger the operator.

Although the invention has been hereinbefore described and illustrated in the accompanying drawings with respect to a single preferred embodiment, it will be appreciated that various modifications and changes may be made therein without departing from the true spirit and scope of the invention; and thus it is not intended to limit the invention except by the terms of the appended claims.

What is claimed is:

1. In a hydraulic steering system for a wheeled vehicle including a pair of hydraulic steering cylinders coupled between the vehicle frame and a pair of pivotal wheel suspension assemblies, said cylinders being arranged to impart turning movement to said assemblies in a first direction responsive to the supply of pressurized hydraulic fluid to first ends of said cylinders and return of fluid from second ends of said cylinders, said cylinders being arranged to impart turning movement to said assemblies in a second opposite direction responsive to the supply of pressurized hydraulic fluid to said second ends of said cylinders and return of fluid from said first ends of said cylinders, a steering valve having a supply conduit, return conduit, and first and second control conduits respectively coupled to said first and second ends of said cylinders, said valve having a neutral position wherein said supply and return conduits are communicated, a first actuated position wherein said supply conduit is communicated with said first control conduit and said second control conduit is communicated with said return conduit, and a second actuated position wherein said supply conduit is communicated with said second control conduit and said first control conduit is communicated with said return conduit, said valve being actuateable from said neutral position to said first position responsive to a fluid signal supplied to a first pilot port thereof and to said second position responsive to a fluid signal supplied to a second pilot port thereof, a pump coupled between a fluid reservoir and said supply conduit to supply pressurized fluid thereto, a steering-wheel-operated, fluid-metering unit having supply and return ports, and first and second control ports, said unit having a neutral steering wheel position, said unit being arranged to block communication between said supply and return ports responsive to turning of said steering wheel from said neutral position in a first direction and responsively develop from fluid pressure at said supply port a fluid signal at said first control port in accordance with the rate and number of revolutions of said steering wheel while communicating said second control port with said return port, said unit being arranged to block communication between said supply and return ports responsive to turning of said steering wheel from said neutral position in a second opposite direction and responsively develop from fluid pressure at said supply port a fluid signal at said second control port in accordance with the rate and number of revolutions of said steering wheel while communicating said first control port with said return port, means communicating said first and second ports of said metering unit with said first and second pilot ports of said steering valve, and relief valve means coupled to said pump for limiting the maximum pressure of fluid supplied therefrom, the improvement comprising a differential valve coupling said return conduit of said steering valve to said supply port of said metering unit and said return port of said metering unit to a second return conduit in communication with said reservoir, said differential valve being arranged to maintain a predetermined pressure differential across said supply and return ports of said metering unit irrespective of fluctuations in back pressure in said second return conduit.

2. The combination of claim 1 further defined by a check valve interposed between said differential valve and said supply conduit of said metering unit to prevent back flow of fluid therefrom.

3. The combination of claim 1 further defined by said differential valve including means for bypassing a volume of fluid in said first return conduit to said second return conduit in excess of the volume of fluid required to establish a pressure at said supply port of said metering unit equal to the sum of said pressure differential and back pressure in said second return conduit.

4. The combination of claim 3 further defined by said differential valve including a body having a first inlet port in communication with a first outlet port and a second inlet port in communication with a second outlet port, said first inlet and outlet ports respectively communicated with said first return conduit and said supply port of said metering unit, said second inlet and outlet ports respectively communicated with said return port of said metering unit and said second return conduit, said differential valve including a spool within said body normally blocking communication between said first inlet port and second outlet port, said differential valve including a poppet having a first force acting thereon equal to the sum of a predetermined constant force and the force due to back pressure in said second return conduit, said first force balanced by a second force due to pressure in said first inlet port, said poppet being actuated in response to said second force exceeding said first force, said valve including means for actuating said spool to an actuated position wherein said first inlet port is communicated with said second outlet port responsive to actuation of said poppet.

5. The combination of claim 4, further defined by said spool being translatable between said normal and actuated positions thereof, said spool having an internal bore, said body having a passage communicating said first inlet and outlet ports with said internal bore, said body having a chamber on the opposite side of said spool from said bore, a spring within said chamber biasing said spool to said normal position thereof, said spool having an orifice communicating said passage with said chamber, means defining a second chamber, said body having a second passage communicating said first and second chambers, said poppet disposed in said second chamber, a second spring disposed in said second chamber biasing said poppet into closing relation with the termination of said second passage in said second chamber, and means communicating said second return conduit with said second chamber.

6. The combination of claim 1 further defined by a follow-up hydraulic cylinder coupled between said vehicle frame and said wheel suspension assemblies, said follow-up cylinder having first and second conduits communicating with first and second chambers at its opposite ends, said follow-up cylinder permitting fluid flow into said first conduit thereof and expelling fluid from said second conduit thereof responsive to turning movement of said assemblies in said first direction thereof, said follow-up cylinder permitting fluid flow into said second conduit thereof and expelling fluid from said first conduit thereof responsive to turning movement of said assemblies in said second direction thereof, means communicably connecting said first and second control ports of said metering unit to said first and second conduits of said follow-up cylinder, and means for automatically bleeding said first and second chambers and conduits of said follow-up cylinder responsive to turning of said steering wheel.

7. The combination of claim 6 further defined by the bleeding means comprising a pair of opposed check valves respectively communicating said return conduit with said first and second conduits of said follow-up cylinder.

8. The combination of claim 7 further defined by an orifice interposed between said return conduit and said check valves.

9. The combination of claim 6 further defined by said differential valve including means for bypassing a volume of fluid in said first return conduit to said second return conduit in excess of the volume of fluid required to establish a pressure at said supply port of said metering unit equal to the sum of said pressure differential and back pressure in said second return conduit.

10. The combination of claim 9 further defined by said differential valve including a body having a first inlet port in communication with a first outlet port and a second inlet port in communication with a second outlet port, said first inlet and outlet ports respectively communicated with said first return conduit and said supply port of said metering unit, said second inlet and outlet ports respectively communicated with said return port of said metering unit and said second return conduit, said differential valve including a spool within said body normally blocking communication between said first inlet port and second outlet port, said differential valve including a poppet having a first force acting thereon equal to the sum of a predetermined constant force and the force due to back pressure in said second return conduit, said first force balanced by a second force due to pressure in said first inlet port, said poppet being actuated in response to said second force exceeding said first force, said valve including means for actuating said spool to an actuated position wherein said first inlet port is communicated with said second outlet port responsive to actuation of said poppet.

11. The combination of claim 10 further defined by a check valve interposed between said first outlet port of said differential valve and said supply port of said metering unit.

12. The combination of claim 10 further defined by the bleeding means comprising a pair of opposed check valves respectively coupled to said first and second conduits of said follow-up cylinder, and means including an orifice communicably connecting said first return conduit to said check valves.

13. The combination of claim 12 further defined by said spool being translatable between said normal and actuated positions thereof, said spool having an internal bore, said body having a passage communicating said first inlet and outlet ports with said internal bore, said body having a chamber on the opposite side of said spool from said bore, a spring within said chamber biasing said spool to said normal position thereof, said spool having an orifice communicating said passage with said chamber, means defining a second chamber, said body having a second passage communicating said first and second chambers, said poppet disposed in said second chamber, a second spring disposed in said second chamber biasing said poppet into closing relation with the termination of said second passage in said second chamber, and means communicating said second return conduit with said second chamber.

14. The combination of claim 13 further defined by a check valve interposed between said first outlet port of said differential valve and said supply port of said metering unit.

15. In a hydraulic steering system for a wheeled vehicle including a pair of hydraulic steering cylinders coupled between the vehicle frame and a pair of pivotal wheel suspension assemblies, said cylinders being arranged to impart turning movement to said assemblies in a first direction responsive to the supply of pressurized hydraulic fluid to first ends of said cylinders and return of fluid from second ends of said cylinders, said cylinders being arranged to impart turning movement to said assemblies in a second opposite direction responsive to the supply of pressurized hydraulic fluid to said second ends of said cylinders and return of fluid from said first ends of said cylinders, a steering valve having a supply conduit, return conduit, and first and second control conduits respectively coupled to said first and second ends of said cylinders, said valve having a neutral position wherein said supply and return conduits are communicated, a first actuated position wherein said supply conduit is communicated with said first control conduit and said second control conduit is communicated with said return conduit, and a second actuated position wherein said supply conduit is communicated with said second control conduit and said first control conduit is communicated with said return conduit, said valve being actuateable from said neutral position to said first position responsive to a fluid signal supplied to a first pilot port thereof and to said second position responsive to a fluid signal supplied to a second pilot port thereof, a pump coupled between a fluid reservoir and said supply conduit to supply pressurized fluid thereto, a steering-wheel-operated, fluid-metering unit having supply and return ports, and first and second control ports, said unit having a neutral steering wheel position wherein said supply and return ports are communicated, said unit being arranged to block communication between said supply and return ports responsive to turning of said steering wheel from said neutral position in a first direction and responsively develop from fluid pressure at said supply port a fluid signal at said first control port in accordance with the rate and number of revolutions of said steering wheel while communicating said second control port with said return port, said unit being arranged to block communication between said supply and return ports responsive to turning of said steering wheel from said neutral position in a second opposite direction and responsively develop from fluid pressure at said supply port a fluid signal at said second control port in accordance with the rate and number of revolutions of said steering wheel while communicating said first control port with said return port, means communicating said first and second ports of said metering unit with said first and second pilot ports of said steering valve, and relief valve means coupled to said pump for limiting the maximum pressure of fluid supplied therefrom, the improvement comprising a follow-up hydraulic cylinder coupled between said vehicle frame and said wheel suspension assemblies, said follow-up cylinder having first and second conduits communicating with first and second chambers at its opposite ends, said follow-up cylinder permitting fluid flow into said first conduit thereof and expelling fluid from said second conduit thereof responsive to turning movement of said assemblies in said first direction thereof, said follow-up cylinder permitting fluid flow into said second conduit thereof and expelling fluid from said first conduit thereof responsive to turning movement of said assemblies in said second direction thereof, means communicably connecting said first and second control ports of said metering unit to said first and second conduits of said follow-up cylinder, and means for automatically bleeding said first and second chambers and conduits of said follow-up cylinder responsive to turning of said steering wheel.

16. The combination of claim 15 further defined by the bleeding means comprising a pair of opposed check valves respectively coupled to said first and second conduits of said follow-up cylinder, and means including an orifice communicably connecting said first return conduit to said check valves.

* * * * *